United States Patent

[11] 3,599,154

[72] Inventors John A. Carol, Jr.
Flint;
Charles S. Cardani, Grand Blanc; Arthur J. Schoendorff, Flint, all of, Mich.
[21] Appl. No. 21,076
[22] Filed Mar. 19, 1970
[45] Patented Aug. 10, 1971
[73] Assignee General Motors Corporation
Detroit, Mich.

[54] DIGITAL SPEED CONTROL SYSTEM
7 Claims, 7 Drawing Figs.
[52] U.S. Cl. .................................................. 340/172.5,
123/97 R, 180/105, 317/5, 324/161
[51] Int. Cl. .......................................................G05d 13/00
[50] Field of Search ........................................... 340/172.5;
324/161; 317/5; 123/97; 180/105

[56] References Cited
UNITED STATES PATENTS
3,455,411 7/1969 Carp et al. ................... 180/105

Primary Examiner—Raulfe B. Zache
Attorneys—Jean L. Carpenter and Paul Fitzpatrick ABSTRACT: A controlled apparatus digital speed control system employing a memory register for counting a series of pulses having a frequency corresponding to the speed of the controlled apparatus for a specified duration of time and a tracking register for periodically counting the series of pulses for the same specified duration of time. A comparator compares the number of pulses counted in the memory register with the number of pulses counted in the tracking register and generates outputs which are utilized to maintain the speed of the controlled apparatus.

INVENTORS.
John A. Carol, Jr.,
BY Charles S. Cardani &
Arthur J. Schoendorff
Paul Fitzpatrick
ATTORNEY

DIGITAL SPEED CONTROL SYSTEM

This invention relates to a digital speed control system for maintaining the speed of a controlled apparatus at a speed selected by the operator of the controlled apparatus.

Speed control systems presently used are usually comprised of either a mechanical servomechanism which is operative by feedback control or an electrical analog system whereby an analog signal which represents the desired speed is generated to be compared with another generated analog signal which represents the actual speed.

It is an object of this invention to provide for a digital speed control system.

It is another object of this invention to provide for a speed control system having high tracking accuracy.

It is another object of this invention to provide for a digital speed control system in which the desired speed and the actual speed are represented by binary numbers generated within digital registers.

It is another object of this invention to provide for a digital speed control system having proportional control.

These and other objects of this invention are accomplished by generating a series of pulses having a frequency corresponding to the speed of the controlled apparatus and utilizing these pulses to step digital registers. When the controlled apparatus is at the desired speed, the series of pulses is supplied to a memory register for a specified duration of time so as to step the memory register and generate a binary number representing the frequency of the series of pulses and therefore the desired speed of the controlled apparatus. Thereafter, the desired speed is stored in the memory register and will remain fixed regardless of future changes in the actual speed of the controlled apparatus. In order to provide for speed control, the series of pulses are periodically supplied to a tracking register so as to step the tracking register and generate a binary number which represents the frequency of the series of pulses and therefore the actual speed of the controlled apparatus. This binary number is compared with the binary number generated within the memory register so as to determine an error in speed. This error in speed is utilized to control the speed of the controlled apparatus in a manner so as to maintain the desired speed.

In the preferred embodiment as hereinafter discussed, the digital speed control system is illustrated with reference to a vehicle having a throttle controlled internal combustion engine. It is understood that the digital speed control system is not limited thereto but may be utilized to control the speed of any controlled apparatus which may be, for example, an electric motor.

In addition, the elements such as a speed pickup, square wave generator, clock, inverters, time delays, and logic gates which are mentioned in the preferred embodiment as hereinafter discussed, are standard elements having standard functions and are well known in the art. Therefore, specific designs of such elements are not shown.

Also in the following description, a "1" bit is equivalent to a positive DC voltage level while a "0" bit is equivalent to a substantially zero voltage level.

The invention may be best understood by reference to the following detailed description of a preferred embodiment and the accompanying drawings, in which.

Figure 1:
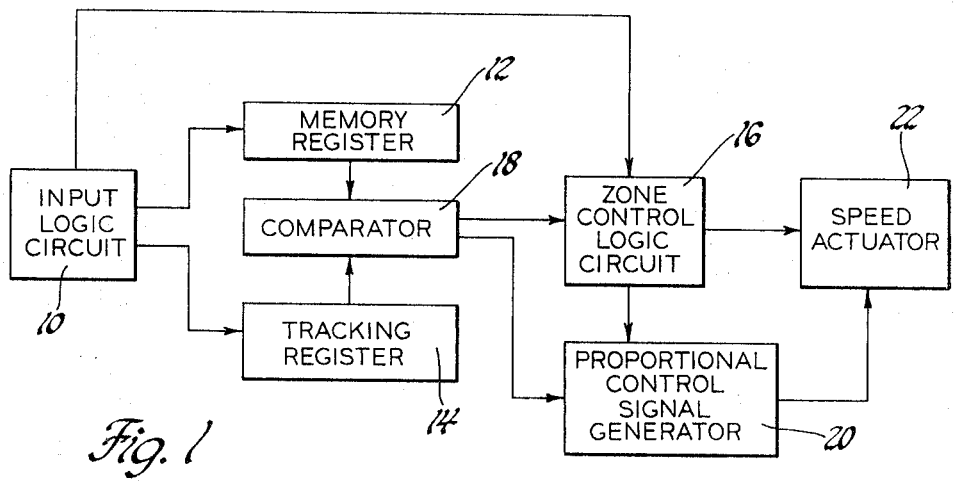
FIG. 1 is a block diagram of the present invention.

Referring to FIG. 1, an input logic circuit 10 supplies to a memory register 12 a register clearing signal and a series of pulses which represents the speed at which a vehicle is to be maintained for stepping the memory register 12 so as to generate a binary number representing the speed at which the vehicle is to be maintained. In addition, the input logic circuit 10 supplies to a tracking register 14 a register clearing pulse and a series of pulses representing the actual speed of the vehicle so as to step the tracking register 14 and generate a binary number representing the actual speed of the vehicle. The input logic circuit 10 also supplies a control signal to a zone control logic circuit 16. A comparator 18 compares the binary number generated within the memory register 12 with the binary number generated within the tracking register 14 and supplies a signal to the zone control logic circuit 16 and a signal to a proportional control signal generator 20. A speed actuator 22 receives an input from the zone control logic circuit 16 and a signal from the proportional control signal generator 20 and controls the speed of the vehicle so as to maintain the desired speed as represented by the binary number generated within the memory register 12.

INPUT LOGIC CONTROL CIRCUIT

Figure 2:
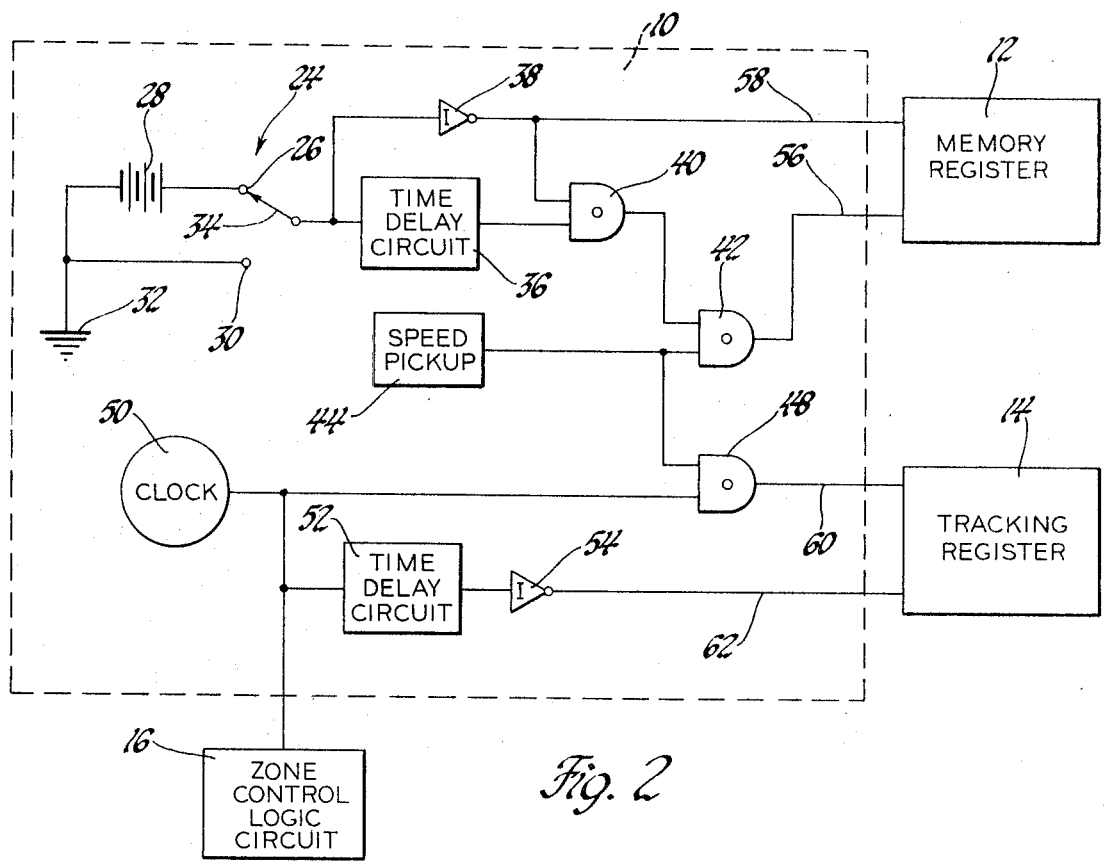
FIG. 2 is a schematic diagram of the input logic circuit of FIG. 1.

Referring to FIG. 2, the input logic control circuit 10 is comprised of a toggle switch 24 having a contact 26 connected to the positive terminal of a source of electric power 28, a contact 30 connected to a ground 32 and a contact 34 operably movable so as to engage either the contact 26 or the contact 30. The source of electric power 28, which may be, for example, the vehicle battery, has its negative terminal connected to the ground 32. The contact 34 is connected to the input of a time delay circuit 36 and to the input of an inverter 38. The output of the time delay circuit 36 is connected to an input of an AND gate 40. The output of the inverter 38 is connected to an input of the AND gate 40 and to the memory register 12. The output of the AND gate 40 is connected to an input of an AND gate 42. A speed pickup 44 which may be, for example, a reed switch operated by a rotating magnet, generates a series of pulses having a frequency corresponding to the speed of the vehicle. Such a speed pickup is well known and therefore will not be described in greater detail. The output of the speed pickup 44 is connected to an input of the AND gate 42 and an input of an AND gate 48. The output of the AND gate 42 is connected to the memory register 12.

When the vehicle speed is not being controlled, the contact 34 is in engagement with the contact 26. The inverter 38 inverts the "1" bit appearing at its input to a "0" bit at its output, which "0" bit clears the memory register 12 and inhibits the AND gate 40. The "0" bit at the output of the inhibited AND gate 40 inhibits the AND gate 42. Therefore the input to the memory register from the AND gate 42 is a "0" bit.

In order to maintain the vehicle at a speed selected by the vehicle operator, a number of pulses representing the frequency of the pulse output of the speed pickup 44 and therefore the desired speed of the vehicle is supplied to the memory register 12 so as to step the memory register and generate a binary number which represents the desired speed. This is accomplished by gating the output pulses of the speed pickup 44 with a pulse of a specified duration of time so as to periodically enable the AND gate 42 to supply the number of pulses to the memory register 12. The pulse of a specified time duration is obtained by positioning the contact 34 into engagement with the contact 30. The inverter 38 inverts the "0" bit appearing at its input to a "1" bit at its output, which "1" bit constitutes an input to the AND gate 40. In addition, the output of the time delay circuit 36 will continue to be a "1" bit for the specified time duration as determined by its time constant, after which time a "0" bit will appear at its output so as to inhibit the AND gate 40. As can be seen, the AND gate 40 is enabled for the specified time duration as determined by the time delay circuit 36. During this period of time, the AND gate 40 supplies a "1" bit to an input of the AND gate 42. During this period of time, the AND gate 42 is periodibled by the series of pulses at the output of the speed pickup 44. Therefore, the output of the AND gate 42 is a series of "1" bit pulses having a frequency corresponding to the frequency of the output of the speed pickup 44 and therefore corresponding to the speed of the vehicle. Since the AND gate 42 is periodically enabled only so long as a "1" occurs at the output of the AND gate 40, which output occurs for the specified duration of time is determined by the time delay circuit 36, the number of "1" bit pulses occurring at the output of the AND gate 42 represents the frequency of the pulse output of the speed pickup 44 and therefore the speed of the vehicle. This number of "1" bit pulses constitutes the input to the memory register 12.

A clock 50 generates a series of "1" bit pulses whereby the time duration of each "1" bit pulse is equal to the time delay of the time delay circuit 36. The output of the clock 50 is connected to an input of the AND gate 48, the input to a time delay circuit 52, and an input to the zone control logic circuit 16. The output of the AND gate 48 is connected to the tracking register 14. The output of the time delay circuit 52 is connected to the input of an inverter 54 whose output is connected to the tracking register 14.

During the time when the output of the clock 50 is a "1" bit, the AND gate 48 is periodically enabled by the series of pulses at the output of the speed pickup 44. Therefore, the output of the AND gate 48 is a series of "1" bit pulses having a frequency corresponding to the frequency of the output of the speed pickup 44 and therefore the speed of the vehicle. Since the AND gate 48 can be enabled only during the time that the output of the clock 50 is a "1" bit, which time is of a specified duration, the number of pulses occurring at the output of the AND gate 48 represents the frequency of the output pulses of the speed pickup 44 and therefore the actual speed of the vehicle. This number of "1" bit pulses constitutes an input to the tracking register 14, which input steps the tracking register 14 and generates a binary number which represents the actual speed of the vehicle. The time delay circuit 52 delays the "1" bit pulse output from the clock 50 such that the "1" bit pulse at the output of the time delay circuit 52 occurs between the "1" bit pulses at the output of the clock 50. This output is inverted by the inverter 54 such that a "0" output occurs at the output of the inverter 54 between each "1" bit output of the clock 50. This output constitutes a register clearing signal to the tracking register 14 so as to clear the tracking register 14 between each "1" bit output of the clock 50.

As can be seen, the number of pulses which occur at the output of the AND gate 42 is determined solely by the number of pulses occurring at the output of the speed pickup 44 during the duration of the time delay of the time delay circuit 36. In addition, it can be seen that this series of "1" bit pulses can occur only once each time the contact 34 is moved into engagement with the contact 30. Also, it can be seen that the number of "1" bit pulses occurring at the output of the AND gate 48 is a function of the number of pulses occurring at the output of the speed pickup 44 during a "1" bit output of the clock 50. Since the time duration of the "1" bit output of the clock 50 is equal to the duration of the time delay of the time delay circuit 36, the number of pulses which occur at the output of the AND gate 42 and the AND gate 48 will be identical for a given frequency of the output signal of the speed pickup 44 and therefore a given speed of the vehicle. Unlike the output of the AND gate 42, the series of pulses occurring at the output of the AND gate 48 is repetitive in that the series of pulses occurs for each "1" bit output of the clock 50. In addition, the output of the inverter 54 changes from a "1" bit to a "0" bit between each series of pulse outputs of the AND gate 48 so as to clear the tracking register 14.

MEMORY AND TRACKING REGISTERS

Figure 3:
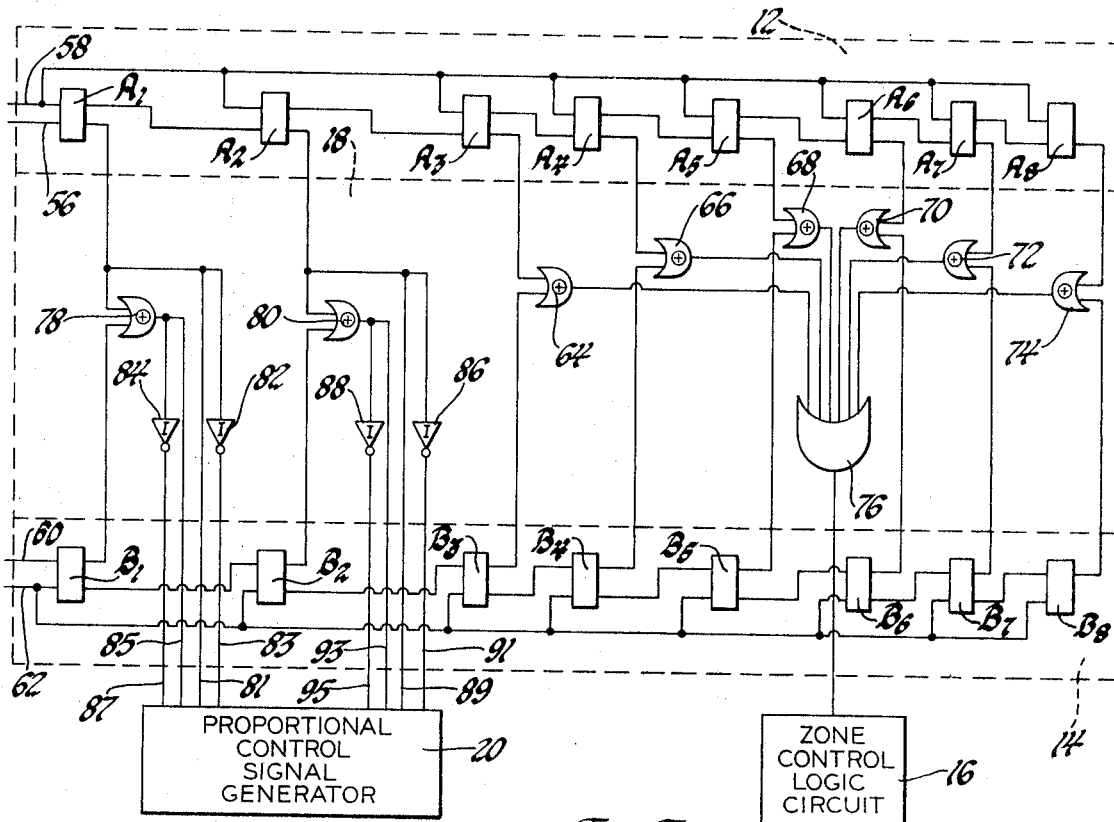
FIG. 3 is a schematic diagram of the memory register, tracking register, and comparator of FIG. 1.

Referring to FIG. 3, the memory register 12 is comprised of a series of flip-flops designated $A_1$ to $A_8$ connected so as to form a binary counter having an input step line 56 and an input clearing line 58.

The tracking register 14 is comprised of a series of flip-flops designated $B_1$ to $B_8$ connected so as to form a binary counter having an input step line 60 and an input clearing line 62.

Referring to FIGS. 2 and 3, the input step line 56 is connected to the output of the AND gate 42 and the input clearing line 58 is connected to the output of the inverter 38. The input step line 60 is connected to the output of the AND gate 48 and the input clearing line 62 is connected to the output of the inverter 54.

When the contact 34 is positioned into engagement with the contact 30, the series of "1" bit pulses at the output of the AND gate 42 step the memory register 12 so as to generate within the memory register 12 a binary number in the form of bits on the outputs of the flip-flops $A_1$ to $A_8$ ranging from low to high order, which binary number represents the frequency of the pulse output of the speed pickup 44 and therefore the speed of the vehicle. In addition, the tracking register 14 is periodically stepped by the series of "1" bit pulses at the output of the AND gate 48 so as to generate within the tracking register 14 a binary number in the form of bits on the outputs of the flip-flops $B_1$ to $B_8$ ranging from low to high order, which binary number represents the frequency of the pulse output of the speed pickup 44 and therefore the actual speed of the vehicle. Between each series of pulses which are counted by the tracking register 14, a "0" bit output of the inverter 54 clears the tracking register 14 so that each series of pulses counted represents the actual speed of the vehicle.

COMPARATOR

The comparator 18 compares each pair of equal order bits generated within the memory register 12 and the tracking register 14. The higher ordered bits as represented by the outputs of the flip-flops $A_3$ to $A_8$ in the memory register 12 are with the corresponding higher ordered bits as represented by the outputs of the flip-flops $B_3$ to $B_8$ in the tracking register 14. The outputs of each pair of flip-flops of corresponding order $A_3$, $B_3$ to $A_8$, $B_8$ are connected to the inputs of the respective EXCLUSIVE OR gates 64, 66, 68, 70, 72 and 74. A "1" bit will occur at the output of an EXCLUSIVE OR gate when the inputs are not both "0" bits or both "1" bits. The outputs of the EXCLUSIVE OR gates 64, 66, 68, 70, 72 and 74 are connected to respective inputs of an OR gate 76. The OR gate 76 receives the outputs of the EXCLUSIVE OR gates 64, 66, 68, 70, 72 and 74 and supplies a "1" bit output when any pair of the equal ordered bits being compared are not both "0" bits or "1" bits. This output is connected to the zone control logic circuit 16.

The outputs of the remaining pairs of flip-flops $A_1$, $B_1$ and $A_2$, $B_2$ are connected to the inputs of the respective EXCLUSIVE OR gates 78 and 80. A "1" bit output will be generated by the EXCLUSIVE OR gates 78 and 80 when their respective inputs are not both "0" bits or both "1" bits. In addition, the output of the flip-flop $A_1$ is connected to the proportional control signal generator 20 by a line 81 and an inverter 82 whose output is connected to the proportional control signal generator 20 by a line 83. The output of the EXCLUSIVE OR gate 78 is connected to the proportional control signal generator 20 by a line 85 and to the input of an inverter 84 whose output is connected to the proportional control signal generator 20 by a line 87. The output of the flip-flop $A_2$ is also connected to the proportional control signal generator 20 by a line 89 and to an inverter 86 whose output is connected to the proportional control signal generator 20 by a line 91. The output of the EXCLUSIVE OR gate 80 is connected to the proportional control signal generator 20 by a line 93 and to an inverter 88 whose output is connected to the proportional control signal generator 20 by a line 95.

As can be seen, the comparator 18 will produce a "1" bit output at the output of the OR gate 76 when the binary numbers generated within the memory register 12 and the tracking register 14 are not identical as represented by the higher ordered bits generated within the flip-flops $A_3$ to $A_8$ and $B_3$ to $B_8$. In addition, the comparator will provide an output from each pair of the lower ordered flip-flops $A_1$, $B_1$ and $A_2$, $B_2$ at the outputs of the EXCLUSIVE OR gates 78 and 80, respectively. In addition, the outputs of the EXCLUSIVE OR gates 78 and 80 are inverted by the respective inverters 84 and 88 so as to provide a "1" bit signal when the outputs of the respective pairs of flip-flops $A_1$, $B_1$ and $A_2$, $B_2$ are equal. In addition, the outputs of the flip-flops $A_a$ and $B_2$ are supplied to the proportional control signal generator 20 along with the inverse of the outputs.

ZONE CONTROL LOGIC CIRCUIT

Figure 4:
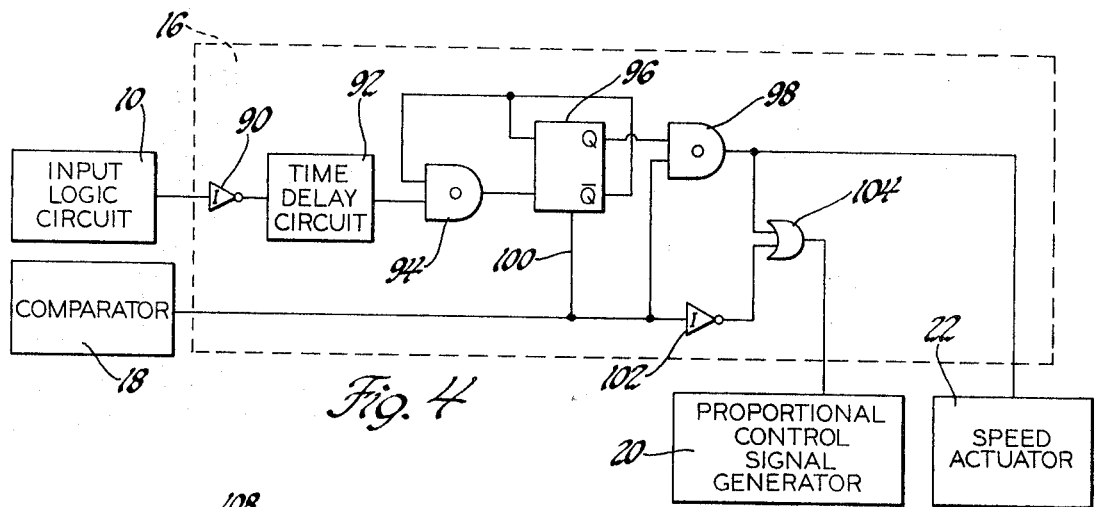
FIG. 4 is a schematic diagram of the zone control logic circuit of FIG. 1.

Referring to FIG. 4, the zone control logic circuit 16 receives an input from the clock 50 of the input logic circuit 10 of FIG. 2 and an input from the OR gate 76 of the comparator 18 of FIG. 3. The output of the clock 50 is connected to the input of an inverter 90 whose output is connected to a time delay circuit 92. The output of the time delay circuit 92 is connected to an input of an AND gate 94 whose output is connected to an input of a flip-flop 96. An output of the flip-flop 96 designated Q is connected to an input of the AND gate 94. An output of the flip-flop 96 designated $\overline{Q}$ is connected to an input of an AND gate 98. The input from the OR gate 76 in the comparator 18 is connected to a clearing line 100 of the flip-flop 96, an input of the AND gate 98 and to the input of an inverter 102. The output of the AND gate 98 is connected to an input of an OR gate 104 and to the speed actuator 22. The output of the inverter 102 is connected to an input of the OR gate 104 whose output is connected to the proportional control signal generator 20.

When a binary number representing the desired vehicle speed has been generated within the memory register 12, a "1" bit will be present at the output of the OR gate 76 when the tracking register 14 has been cleared by the "0" bit output of the inverter 54. When the "1" bit pulse occurs at the output of the clock 50, the tracking register begins to count the pulses appearing on the input step line 60. At the same time the output of the inverter 90 changes to a "0" state. The output of the time delay circuit 92 changes to a "0" state a specified time duration later to inhibit the AND gate 94 to set the Q output of the flip-flop 96 to a "1" bit and the $\overline{Q}$ output to a "0" bit. During this time duration the output of the OR gate 76 remains a "1" bit since the time delay of the time delay circuit 92 is short with respect to the time duration of the "1" bit output of the clock 50. Therefore the AND gate 98 is enabled to supply a "1" bit to the speed actuator 22 which "1" bit indicates an underspeed out-of-zone condition whereby an out-of-zone condition exists when the binary numbers generated in the higher ordered flip-flops $A_3$ to $A_8$ and $B_3$ to $B_8$ in the memory register 12 and the tracking register 14 respectively are not equal. This indication will continue until the binary number generated in the higher ordered flip-flops $B_3$ to $B_8$ in the tracking register 14 equal the corresponding binary number generated in the higher ordered flip-flops $A_3$ to $A_8$ in the memory register 12 at which time the output of the OR gate 76 will change from a "1" bit to a "0" bit. The "0" bit on the clear line 100 will set the Q output to a "0" bit to inhibit the AND gate 98 and set the $\overline{Q}$ output to a "1" bit. Therefore, a "0" bit will be supplied to the speed actuator 22 and a "1" bit will be supplied to the proportional control signal generator 20. These conditions represent an in-zone condition which occurs when any error between the binary number in the memory register 12 and the tracking register 14 exists only in that portion of the binary numbers represented by the lower ordered flip-flops $A_1$, $A_2$ and $B_1$, $B_2$. If the speed of the vehicle is yet higher such that the vehicle speed as represented by the binary number generated in the higher ordered flip-flops $B_3$ and $B_8$ in the tracking register 14 is greater than the desired speed as represented by the binary number generated in the higher ordered flip-flops $A_3$ to $A_8$ in the memory register, the "0" bit output of the OR gate 76 will change to a "1" state. Since the AND gate 98 remains inhibited by the Q output, a "0" bit is supplied to the speed actuator 22 and a "0" bit is supplied to the proportional control signal generator 20. These conditions represent an overspeed out-of-zone condition.

PROPORTIONAL CONTROL SIGNAL GENERATOR

Figure 5:
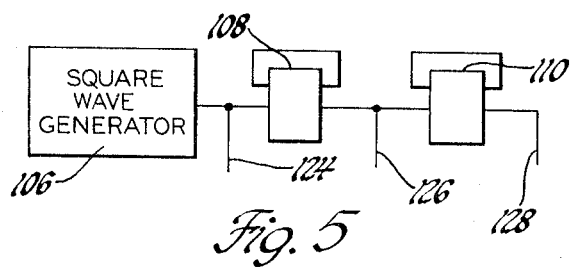
FIG. 5 is a schematic diagram of a signal generator utilized in the proportional control signal generator of FIG. 1.
Figure 6:
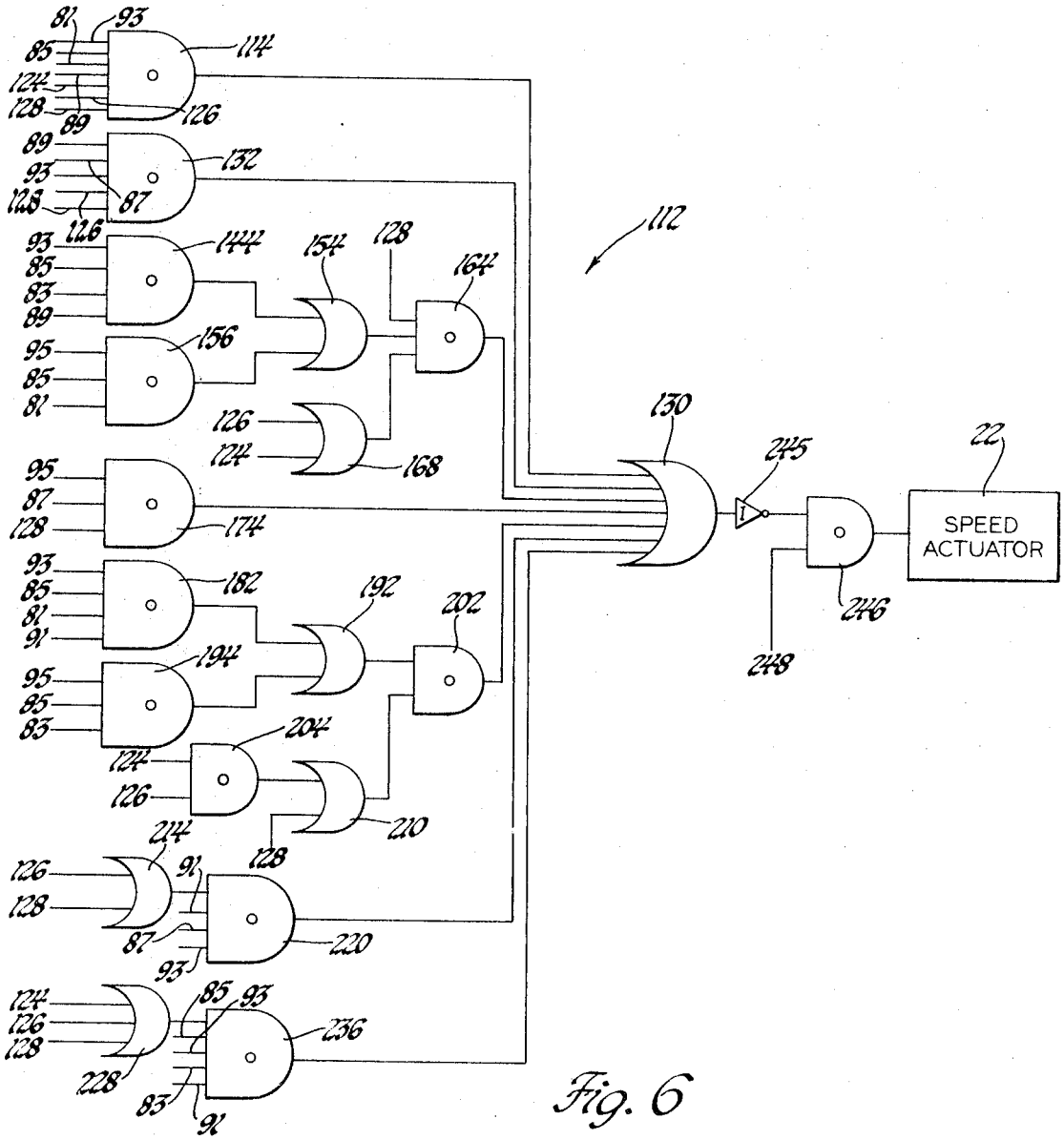
FIG. 6 is a schematic diagram of an error decoder utilized in the proportional control signal generator of FIG. 1; and, FIG. 7 is a schematic diagram of the speed actuator of FIG. 1.

Referring to FIGS. 5 and 6 a square wave generator 106 supplies series of pulses to a flip-flop 108. The output of the flip-flop 108 is connected to an input of a flip-flop 110. The output of the flip-flop 108 is a square wave signal having a frequency one-half the frequency of the square wave generator 106. The output of the flip-flop 110 is a square wave signal having a frequency one-fourth of the frequency of the output of the square wave generator 106.

An error decoder 112 determines an error in the binary number generated within the flip-flops $B_1$ and $B_2$ in the tracking register 14 with respect to the binary number generated within the flip-flops $A_1$ and $A_2$ in the memory register 12 and supplies a signal comprised of a series of "1" bits and "0" bits whereby the time duration of the "1" bits with respect to the "0" bits is a function of the error determined.

Referring to FIGS. 3, 5 and 6, an AND gate 114 is comprised of an input from the line 93, an input from the line 85, an input from the line 81, an input from the line 89, an input from a line 124 connected to the output of the square wave generator 106, an input from a line 126 connected to the output of the flip-flop 108, and an input from a line 128 connected to the output of the flip-flop 110. The output of the AND gate 114 is connected to an input of an OR gate 130. When the inputs from the lines 93, 85, 81 and 89 are all "1" bits, the binary number generated within the flip-flops $B_1$ and $B_2$ is three less than the binary number generated within the flip-flops $A_1$ and $A_2$ (an underspeed condition). When this condition exists, the output of the AND gate 114 is a series of "1" bits and "0" bits wherein the total time duration of the "1" bits constitute 12½ percent of the total time.

An AND gate 132 has an input from the line 89, an input from the line 87, an input from the line 93, an input from the line 126 connected to the output of the flip-flop 108, and an input from the line 128 connected to the output of the flip-flop 110. The output of the AND gate 132 is connected to an input of the OR gate 130. When the inputs from the lines 89, 87 and 93 are all "1" bits, the binary number generated within the flip-flops $B_1$ and $B_2$ is two less than the binary number generated within the flip-flops $A_1$ and $A_2$ (an underspeed condition). When this condition exists, the output of the AND gate 132 is a series of "1" bits and "0" bits wherein the total time duration of the "1" bits constitute 25 percent of the total time.

An AND gate 144 is comprised of an input from the line 93, an input from the line 85, an input from the line 83 and an input from the line 89. The output of the AND gate 144 is connected to an input of an OR gate 154. An AND gate 156 is comprised of an input from the line 95, an input from the line 85 and an input from the line 81. The output of the AND gate 156 is connected to an input of the OR gate 154. The output of the OR gate 154 is connected to an input of an AND gate 164. The AND gate 164 is also comprised of an input from the line 128 connected to the output of the flip-flop 110 and an input connected to the output of an OR gate 168. The OR gate 168 is comprised of an input from the line 126 connected to the output of the flip-flop 108 and an input from the line 124 connected to the output of the square wave generator 106. The output of the AND gate 164 is connected to an input of the OR gate 130. When the inputs from the lines 93, 85, 83 and 89 are all "1" bits or the inputs from the lines 95, 85 and 81 are all "1" bits, the binary number generated within the flip-flops $B_1$ and $B_2$ is one less than the binary number generated within the flip-flops $A_1$ and $A_2$ (an underspeed condition). When this condition exists, the output of the AND gate 164 is a series of "1" bits and "0" bits wherein the "1" bits constitute 37½ percent of the total time.

An AND gate 174 has an input from the line 95, an input from the line 87 and an input from the line 128 connected to the output of the flip-flop 110. The output of the AND gate 174 is connected to an input of the OR gate 130. When the inputs from the lines 95 and 87 are all "1" bits, the binary number generated within the flip-flops $B_1$ and $B_2$ is identical to the binary number generated within the flip-flops $A_1$ and $A_2$ (zero speed error). When this condition exists, the output of the AND gate 174 is a series of "1" bits and "0" bits wherein the "1" bits constitute 50 percent of the total time.

An AND gate 182 is comprised of an input from the line 93, an input from the line 85, an input from the line 81 and an input from the line 91. The output of the AND gate 182 is connected to an input of an OR gate 192. An AND gate 194 is comprised of an input from the line 95, an input from the line 85 and an input from the line 83. The output of the AND gate 194 is connected to an input of the OR gate 192 whose output is connected to an input of an AND gate 202. An AND gate 204 is comprised of an input from the line 124 connected to the output of the square wave generator 106 and an input from the line 126 connected to the output of the flip-flop 108. The output of the AND gate 204 is connected to an input of an OR gate 210 which has an additional input from the line 128 connected to the output of the flip-flop 110. The output of the OR gate 210 is connected to an input of the AND gate 202 whose output is connected to an input of the OR gate 130. When the inputs from the lines 93, 85, 81 and 91 are all "1" bits or the inputs from the lines 95, 85 and 83 are all "1" bits, the binary number generated within the flip-flops $B_1$ and $B_2$ is one greater than the binary number generated within the flip-flops $A_1$ and $A_2$ (an overspeed condition). When this condition exists, the output of the AND gate 202 is a series of "1" bits and "0" bits wherein the "1" bits constitute 62½ percent of the total time.

An OR gate 214 is comprised of an input from the line 126 connected to the output of the flip-flop 108 and an input from the line 128 connected to the output of the flip-flop 110. The output of the OR gate 214 is connected to an input of an AND gate 220. In addition, the AND gate 220 is comprised of an input from the line 91, an input from the line 87 and an input from the line 93. The output of the AND gate 220 is connected to an input of the OR gate 130. When the inputs from the lines 91, 87 and 93 are all "1" bits, the binary number generated within the flip-flops $B_1$ and $B_2$ is two greater than the binary number generated within the flip-flops $A_1$ and $A_2$ (an overspeed condition). When this condition exists, the output of the AND gate 220 is a series of "1" bits and "0" bits wherein the "1" bits constitute 75 percent of the total time.

An OR gate 228 is comprised of an input from the line 124 connected to the output of the square wave generator 106, an input from the line 126 connected to the output of the flip-flop 108 and an input from the line 128 connected to the output of the flip-flop 110. The output of the OR gate 228 is connected to an input of an AND gate 236. In addition, the AND gate 236 is comprised of an input from the line 85, an input from the line 93, an input from the line 83 and an input from the line 91. The output of the AND gate 236 is connected to the input of the OR gate 130. When the inputs from the lines 85, 93, 83 and 91 are all "1" bits the binary number generated within the flip-flops $B_1$ and $B_2$ is three greater than the binary number generated within the flip-flops $A_1$ and $A_2$ (an overspeed condition). When this condition exists, the output of the AND gate 236 is a series of "1" bits and "0" bits wherein the "1" bits constitute 87½ percent of the total time.

The output of the OR gate 130 is connected to the input of an inverter 245 whose output is connected to an input of an AND gate 246. In addition, the AND gate 246 is comprised of an input line 248 connected to the output of the OR gate 104 of the zone control logic circuit 16 of FIG. 4. The output of the AND gate 246 is connected to the speed actuator 22.

The output of the OR gate 130 is a series of "1" bits and "0" bits corresponding to the vehicle speed error as determined from the comparison of the binary number generated in the lower ordered flip-flops $A_n$, $A_2$ and $B_1$, $B_2$. This output is inverted by the inverter 245. The input on the input line 248 is a "1" bit when the speed of the vehicle is underspeed out-of-zone and in-zone. During these conditions the output of the inverter 245 periodically enables the AND gate 246 to supply a series of "1" bits and "0" bits to the speed actuator 22 corresponding to the output of the inverter 245. When the speed of the vehicle is overspeed out-of-zone, the input on the input line 248 is "0" bit which inhibits the AND gate 246 so as to supply a continuous "0" bit to the speed actuator 22.

SPEED ACTUATOR

Figure 7:
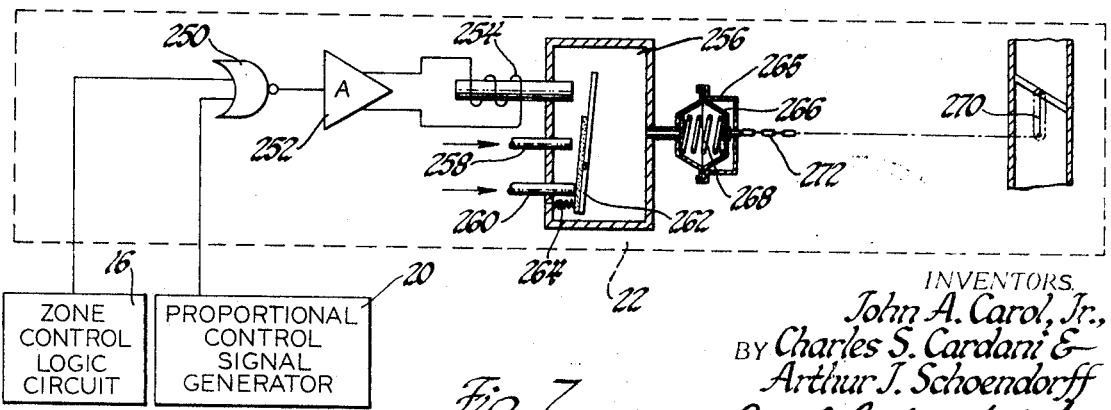

Referring to FIG. 7, the speed actuator 22 is comprised of a NOR gate 250 which receives one input from the AND gate 98 is the zone control logic circuit 16 and a second input from the AND gate 246 in the proportional control signal generator 20. The output of the NOR gate 250 is connected to the input of an amplifier 252. The output of the NOR gate 250 will be a "1" bit when both inputs from the zone control logic circuit 16 and the proportional control signal generator 20 are "0" bits. The amplifier 252 provides a current to a solenoid 254 when the output of the NOR gate 250 is a "1" bit. A mixing chamber 256 has a conduit 258 through which vacuum is admitted from a vacuum source, which may be, for example, the vehicle manifold vacuum, and a conduit 260 through which atmospheric air is admitted. A valve member 262 is biased to a first position by a spring member 264 so as to close the atmospheric air inlet through the conduit 260 and admit vacuum through the vacuum conduit 258. The valve member 262 is moved against the bias of the spring 264 by the solenoid 254 so as to close the vacuum inlet of the conduit 258 and open the atmospheric inlet of the conduit 260. The mixing chamber 256 is connected to a pneumatic motor 265 which is comprised of a diaphragm 266 and a spring 268. The diaphragm 266 is connected to a vehicle throttle 270 by means of a link 272. As the pressure within the mixing chamber 256 decreases below atmospheric pressure due to the admission of vacuum through the vacuum conduit 258, the diaphragm 266 is moved against the return force of the spring 268 so as to move the link 272 and the attached throttle 270 to an open position. The throttle 270 is a conventional vehicle internal combustion engine throttle biased toward the closed position. When the vehicle speed is underspeed out-of-zone, the input from the zone control logic circuit 16 is a "1" bit which inhibits the NOR gate 250 whose output is a "0" bit. The solenoid 254 is not energized and the valve member 262 is biased by a spring 264 to close the atmospheric air inlet of the conduit 260 and open the vacuum inlet of the conduit 258. The diaphragm 266 is moved by the vacuum in the mixing chamber 256 against the spring 268 to provide for maximum acceleration.

When the vehicle speed is over speed out-of-zone, the input from the zone control logic circuit 16 is a "0" bit and the input from the proportional control signal generator is a "0" bit. The NOR gate 250 is therefore enabled so as to supply a "1" bit to the amplifier 252. The solenoid 254 is then continually energized and the valve member 262 is positioned to close the vacuum inlet of the conduit 258 and open the atmospheric air inlet of the conduit 260. The diaphragm 266 is moved by the spring 268 to close so as to provide maximum deceleration. When the vehicle speed is in-zone, the input from the zone control logic circuit is a "0" bit and the input from the proportional control signal generator 20 is a series of "1" bits and "0" bits. Therefore when the input from the proportional control signal generator is a "0" bit, the output of the NOR gate is a "1" bit. During the time duration of this "1" bit, the solenoid 254 is energized to move the valve member so as to close off the vacuum inlet of the conduit 258 to open the atmospheric inlet of the conduit 260. For example, when the speed of the vehicle is in-zone and the binary number generated within the flip-flops $B_1$ and $B_2$ in the tracking register 14 is three less than the binary number generated within the flip-flops $A_1$ and $A_2$ in the memory register, which conditions represent maximum in-zone underspeed, the input to the NOR gate 250 from the proportional control signal generator 20 is a series of "1" bits and "0" bits wherein the total time duration of the "1" bits constitute 87½ percent of the total time. Therefore the output of the NOR gate 250 is a series of "1" bits and "0" bits wherein the "1" bits constitute 12½ percent of the total time. During this time period, the solenoid 254 is energized to close the vacuum inlet of the conduit 258 and open the atmospheric inlet of the conduit 260 so as to provide for less than maximum acceleration. As can be seen, the time duration that vacuum is admitted or atmospheric air is admitted to the mixing chamber 256 while the speed of the vehicle is in-zone is determined by the proportional control signal generator 20 and can vary from 12½ percent to 87½ percent so as to provide proportional in-zone speed control. The 12½ percent to 87½ percent range and the particular percentage value assigned to a particular speed error were chosen arbitrarily for illustration purposes. It is understood that the percentage range and percentage value assigned to a particular speed error may be any value determined to provide optimum system response.

The foregoing description provides for proportional control while the vehicle speed is in-zone as determined by the two lower ordered pairs of flip-flops $A_1$, $B_1$ and $A_2$, $B_2$ for illustration purposes only. As can be seen, the effectiveness of the proportional control can be enhanced by additionally utilizing yet higher ordered flip-flops such as $A_3$, $B_3$ for inzone control with additional flip-flop stages on the output of the square wave generator 106 of FIG. 5 and appropriate logic circuitry in the error decoder 112 of FIG. 6. In addition, the proportional control signal generator 20 may be eliminated entirely after which the output of the zone control logic circuit 16 controls the speed actuator so as to provide either maximum acceleration or maximum deceleration for controlling the vehicle speed.

What has been described is a digital speed control system having high tracking accuracy wherein a first binary number representing the desired speed id generated within a first digital register and compared with a second binary number representing the actual speed which is generated in a second digital register for maintaining the desired speed.

What we claim is:

1. In a digital speed control system for maintaining the speed of a controlled apparatus, the combination of a memory register for storing a binary number representing the desired speed of the controlled apparatus, means for stepping the memory register so as to generate within the memory register a binary number representing the desired speed of the controlled apparatus, a tracking register for storing a binary number representing the actual speed of the controlled apparatus, means for alternately stepping the tracking register so as to generate within the tracking register a binary number representing the actual speed of the controlled apparatus and clearing the tracking register, means for comparing the binary number representing the desired speed and the binary number representing the actual speed and for producing a resultant signal, and means connected so as to receive the resultant signal and operatively responsive thereto for maintaining the speed of the controlled apparatus.

2. The apparatus in claim 1 whereby the means for stepping the memory register and the means for alternately stepping the tracking register and clearing the tracking register include means for generating a series of pulses having a frequency corresponding to the speed of the controlled apparatus and whereby the binary number representing the desired speed of the controlled apparatus and the binary number representing the actual speed of the controlled apparatus are determined by the frequency of the series of pulses.

3. The apparatus in claim 2 whereby the controlled apparatus is comprised of a vehicle having a throttle controlled internal combustion engine and the means connected so as to receive the resultant signal and operatively responsive thereto includes the vehicle throttle.

4. In a digital speed control system for maintaining the speed of a controlled apparatus, the combination of a memory register for storing a binary number representing the desired speed of the controlled apparatus, a tracking register for storing a binary number representing the actual speed of the controlled apparatus, means for generating a series of pulses having a frequency corresponding to the speed of the controlled apparatus, means for supplying the series of pulses to the memory register for a specified duration of time when the speed of the controlled apparatus is at the desired speed to be maintained so as to step the memory register and generate within the memory register a binary number representing the frequency of the series of pulses and therefore the desired speed of the controlled apparatus, means for alternately supplying the series of pulses to the tracking register for the specified duration of time so as to step the tracking register and generate within the tracking register a binary number representing the frequency of the series of pulses and therefore the actual speed of the controlled apparatus and clearing the tracking register, means for comparing the binary number representing the desired speed and the binary number representing the actual speed and for producing a resultant signal, and means connected so as to receive the resultant signal and operatively responsive thereto for maintaining the speed of the controlled apparatus.

5. In a digital speed control system for maintaining the speed of a controlled apparatus, the combination of a memory register for storing a binary number in the form of bits ranging from low to high order, a tracking register for storing a binary number in the form of bits ranging from low to high order, means for generating a series of pulses having a frequency corresponding to the speed of the controlled apparatus, means for supplying the series of pulses to the memory register for a specified duration of time when the speed of the controlled apparatus is at the desired speed to be maintained so as to step the memory register and generate within the memory register a series of bits representing a binary number corresponding to the frequency of the series of pulses and therefore the desired speed of the controlled apparatus, means for alternately supplying the series of pulses to the tracking register for the specified duration of time so as to step the tracking register and generate within the tracking register a series of bits representing a binary number corresponding to the frequency of the series of pulses and therefore the actual speed of the controlled apparatus and clearing the tracking register, first comparing means for comparing a specified portion of the binary number represented by the higher ordered bits generated within the memory register with a corresponding portion of the binary number represented by the higher ordered bits generated within the tracking register and producing a first resultant signal, second comparing means for comparing the remaining portions of the binary number represented by the lower ordered bits generated within the memory register with the corresponding remaining portion of the binary number represented by the lower ordered bits generated within the tracking register and for producing a second resultant signal, and means connected so as to receive the first and second resultant signals and operatively responsive thereto for maintaining the speed of the controlled apparatus.

6. In a digital speed control system for maintaining the speed of a controlled apparatus, the combination of a memory register for storing a binary number in the form of bits ranging from low to high order, a tracking register for storing a binary number in the form of bits ranging from low to high order, means for generating a series of pulses having a frequency corresponding to the speed of the controlled apparatus, means for supplying the series of pulses to the memory register for a specified duration of time when the speed of the controlled apparatus is at the desired speed to be maintained so as to step the memory register and generate within the memory register a series of bits representing a binary number corresponding to the frequency of the series of pulses and therefore the desired speed of the controlled apparatus, means for alternately supplying the series of pulses to the tracking register for the specified duration of time so as to step the tracking register and generate within the tracking register a series of bits representing a binary number corresponding to the frequency of the series of pulses and therefore the actual speed of the controlled apparatus and clearing the tracking register, means for providing maximum acceleration or maximum deceleration of the controlled apparatus when the desired speed of the controlled apparatus is respectively greater or less than the actual speed of the controlled apparatus as determined by a specified portion of the binary number represented by the higher ordered bits generated within the memory register and a corresponding portion of the binary number represented by the higher ordered bits generated within the tracking register, and means for providing varying degrees of acceleration or deceleration of the controlled apparatus when the desired speed of the controlled apparatus is respectively greater or less than the actual speed of the controlled apparatus as determined by the remaining portion of the binary number represented by the lower ordered bits generated within the memory register and the corresponding remaining portion of the binary number represented by the lower ordered bits generated within the tracking register, whereby the means for providing maximum acceleration or maximum deceleration and the means for providing varying degrees of acceleration or deceleration are operative so as to maintain the speed of the controlled apparatus.

7. The method of maintaining the speed of a controlled apparatus including the steps of generating a series of pulses having a frequency corresponding to the speed of the controlled apparatus, supplying the series of pulses to a memory register for a specified duration of time so as to step the memory register and generate within the memory register a binary number representing the frequency of the series of pulses and therefore the desired speed of the controlled apparatus, alternately supplying the series of pulses to the tracking register for the specified duration of time so as to step the tracking register and generate within the tracking register a binary number representing the frequency of the series of pulses and therefore the actual speed of the controlled apparatus and clearing the tracking register, comparing the binary number representing the desired speed and the binary number representing the actual speed so as to determine a speed error, producing a resultant signal corresponding to the speed error, and controlling the speed of the controlled apparatus in response to the resultant signal so as to maintain the speed of the controlled apparatus.

PO-1050
(5/69)

UNITED STATES PATENT OFFICE
CERTIFICATE OF CORRECTION

Patent No. 3,599,154      Dated August 10, 1971

Inventor(s) John A. Carol, Jr., Charles S. Cardani and Arthur J. Schoendorff

It is certified that error appears in the above-identified patent and that said Letters Patent are hereby corrected as shown below:

Column 4, line 35, "with the corresponding" should read -- compared with the corresponding --.

Column 5, line 7, "flip-flops $A_a$ and $B_2$" should read -- flip-flops $A_1$ and $B_2$ --; line 21, "designated Q" should read -- designated $\bar{Q}$ --; line 22, "designated $\bar{Q}$" should read -- designated Q --.

Column 8, line 1, "flip-flops $A_a$, $A_2$" should read -- flip-flops $A_1$, $A_2$ --; line 16, "98 is the" should read -- 98 in the --.

Column 9, line 40, "speed id generated" should read -- speed is generated --.

Signed and sealed this 29th day of February 1972.

(SEAL)
Attest:

EDWARD M. FLETCHER, JR.      ROBERT GOTTSCHALK
Attesting Officer                Commissioner of Patents